United States Patent
Hennig

(10) Patent No.: US 7,753,636 B2
(45) Date of Patent: Jul. 13, 2010

(54) ADJUSTABLE BALE MOVER SPIKES

(76) Inventor: Emmett D. Hennig, 1323 S. Broadway St., Decatur, NE (US) 68020

( * ) Notice: Subject to any disclaimer, the term of this patent is extended or adjusted under 35 U.S.C. 154(b) by 326 days.

(21) Appl. No.: 12/079,217

(22) Filed: Mar. 25, 2008

(65) Prior Publication Data
US 2009/0245976 A1 Oct. 1, 2009

(51) Int. Cl.
*A01D 85/00* (2006.01)
*A01D 90/00* (2006.01)
*B66C 1/00* (2006.01)

(52) U.S. Cl. ............ 414/24.5; 414/703; 414/722; 414/911; 414/920; 294/61

(58) Field of Classification Search .......... 187/237; 211/193, 59.1, 85.5; 294/120, 125–130; 414/111, 24.5, 24.6, 607, 635, 638, 642, 414/684, 721, 785, 911; 56/16.1
See application file for complete search history.

(56) References Cited

U.S. PATENT DOCUMENTS

| | | | | |
|---|---|---|---|---|
| 2,896,805 A | * | 7/1959 | Rigsby | 414/607 |
| 3,934,726 A | * | 1/1976 | Martin | 414/24.5 |
| 4,091,947 A | * | 5/1978 | Fischer | 414/703 |
| 4,120,405 A | * | 10/1978 | Jones et al. | 414/24.5 |
| 4,395,189 A | * | 7/1983 | Munten | 414/635 |
| 5,074,733 A | | 12/1991 | Hennig | |
| 7,182,568 B2 | * | 2/2007 | McGinnes | 414/24.5 |
| 2003/0123956 A1 | * | 7/2003 | Noualy | 414/24.5 |

FOREIGN PATENT DOCUMENTS

| | | | |
|---|---|---|---|
| DE | 4142613 A1 | * | 6/1993 |
| DE | 10127949 A1 | * | 12/2002 |
| WO | WO 8906499 A1 | * | 7/1989 |

OTHER PUBLICATIONS

3-Point Round Bale Movers, Models 210F and 211F, one-page colored dealer flyer, Emmett Hennig Manufacturing, Decatur, NE.

* cited by examiner

*Primary Examiner*—Gregory W Adams
(74) *Attorney, Agent, or Firm*—Dennis L. Thomte; Thomte Patent Law Office LLC

(57) ABSTRACT

A bale mover is disclosed which includes a frame having a hitch mounted thereon which may be attached to the three-point hitch of the tractor or to the front end of a front-end loader mounted on the tractor. The frame includes a transversely extending tool bar or main frame member having first and second upstanding posts secured to the outer ends thereof. A pair of tooth supports are vertically slidably mounted on the first and second posts respectively with chains being attached thereto which limit the downward movement of the teeth supports but which permit the tooth supports to float upwardly on the posts as required. The bale mover permits a pair of bales to be loaded, transported and unloaded without the necessity of pushing one of the bales along the ground during the loading or unloading process of the other bale thereby preventing damage to the wrap net material on the bales.

8 Claims, 11 Drawing Sheets

ADJUSTABLE BALE MOVER SPIKES

BACKGROUND OF THE INVENTION

1. Field of the Invention

This invention relates to a bale mover and more particularly to a bale mover which may be mounted on the three-point hitch of a tractor or on the forward end of a front end loader mounted on the tractor. More particularly, the bale mover of this invention enables a pair of bales to be moved by the bale mover. Even more particularly, the instant invention relates to a bale mover which enables a pair of bales to be placed on the ground in a side-by-side relationship without tearing or damaging the plastic net wrap on the bales.

2. Description of the Related Art

Many types of large, round bale handlers, movers or carriers have been previously provided. Some of the early bale movers utilized a bale spear or tooth which was operatively secured to the three-point pitch of a tractor or which was secured to the forward end of a front end loader mounted on the tractor. Assuming that the prior art bale tooth extended rearwardly from the tractor, the tractor operator would back up to a bale and drive the tooth into the bale. The tractor operator would then raise the three-point hitch of the tractor to raise the speared bale from the ground. The tractor operator would then drive to a remote location where the bale would be placed on the ground or stacked on other bales for subsequent storage, transport or consumption. As the size of farm tractors has grown, the bale movers have been modified to enable the bale movers to handle two large round bales in a side-by-side relationship. The bale moving operation has been made more difficult due to the change in the way the large round bales are bound to form the round bale.

Large round bales have traditionally been bound with twine. In recent years, large round bales have been bound with a plastic net wrap material. Although the net wrap material has some advantages over conventional twine, the net wrap material is somewhat more fragile than twine. The large round bales after being baled and wrapped with the plastic net wrap material, are transported from the field to a location for storage and/or consumption. In many cases, the bales are speared by teeth extending rearwardly from a frame mounted on the three-point hitch of a tractor or teeth extending forwardly from a frame mounted on the forward end of the boom arms of a front end loader. It has become popular to successively spear a pair of bales and transport the same to the storage and/or consumption area. Usually, a first bale is speared and lifted from the ground with the tractor then being driven to the location of a second bale. If the second bale is to be speared at the same height as the first bale, the first bale must be lowered into ground engagement and then pushed along the ground as the second bale is speared. The pushing of the first bale along the ground while the second bale is being speared frequently results in the net wrap on the first bale being damaged which causes the bale to disintegrate. To avoid the damage to the net wrap on the first bale as the second bale is being speared, the first bale will normally be supported above the ground and the second bale will be speared at a location in the bale which is higher than the spearing location of the first bale. The two bales are then raised by the three-point hitch of the tractor and then taken to the location for storage and/or consumption. If the second bale was speared in the same general location as the first bale, both bales may be placed on the ground at the same time with the teeth then being withdrawn. However, the normal procedure is to maintain the first bale above the ground during the spearing of the second bale to prevent damage to the first bale's net wrap material. At the time that those bales are to be deposited from the bale mover, the second bale will engage the ground first as the bale mover is lowered which means that the first bale will still be suspended above the ground. It is therefore extremely difficult to maneuver and drag the bales so that the bales will be arranged in a side-by-side relationship without damaging the net wrap. The above scenarios either results in the first bale net wrap being damaged as the second bale is being speared or the second bale net wrap is damaged as the bales are being deposited on the ground in a side-by-side relationship.

SUMMARY OF THE INVENTION

A round bale mover for attachment to either a vertically movable three-point hitch at the rearward end of a tractor or to the forward end of a front-end loader mounted on the tractor is described. The bale mover comprises an elongated transversely and horizontally extending main frame or tool bar which has first and second ends. An upstanding attachment frame is secured to the tool bar between the ends thereof and is adapted to be operatively selectively secured to either the three-point hitch of the tractor or to the forward end of the front-end loader. A first upstanding post has its lower end secured to the first end of the tool bar and extends upwardly therefrom. A second upstanding post has its lower end secured to the second end of the tool bar and extends upwardly therefrom. First and second tubular supports are vertically slidably mounted on the first and second posts respectively which have opposite sides and inner and outer sides. The first and second tubular supports are movable between upper and lower positions with respect to the first and second posts respectively. A first pair of elongated bale teeth are operatively secured to the first tubular support and extend horizontally therefrom. A second pair of spaced-apart bale teeth are operatively secured to the second tubular support and extend horizontally therefrom. The first pair of bale teeth are horizontally spaced-apart to enable the first pair of teeth to be driven into a first round bale. The second pair of teeth are horizontally spaced-apart to enable the second pair of teeth to be driven into a second bale. A first elongated chain or tether member has its upper end secured to the first post adjacent the upper end thereof and has its lower end secured to the first tubular support to limit the downward movement of the first tubular support with respect to the first post. The upper end of the second chain or tether member is secured to the second post adjacent the upper end thereof and has its lower end secured to the second tubular support to limit the downward movement of the second tubular support with respect to the second post.

The effective length of one of the tether members is longer than the effective length of the other tether member so that the tubular support connected to the shorter tether member will be normally positioned in a plane above the other tubular support so that the teeth secured to that tubular support member will be in a plane above the teeth secured to the other tubular support member. The method of utilizing the bale mover of this invention to transport a pair of bales from a field location to remote location is also described.

It is therefore a principal object of the invention to provide an improved bale mover.

A further object of the invention is to provide an improved bale mover which may be utilized to pick up and transport a pair of round bales and move the same to a distant location for storage and/or consumption without the net wrap material on the bales being damaged during the loading and unloading of the large round bales.

Yet another object of the invention is to provide a bale mover of the type described wherein the first and second pairs of bale teeth are movably supported on a pair of upstanding posts in a free-floating manner with the lower position thereof being determined by the length of a tether member operatively connected thereto.

These and other objects will be apparent to those skilled in the art.

DESCRIPTION OF THE PREFERRED EMBODIMENT

In the schematic drawings of FIGS. 4-19, which are views as would be seen from the tractor looking rearwardly, the numeral 6 refers to a first large round bale to be moved while the numeral 8 refers to a second large round bale to be moved. In FIGS. 4-19, a small inverted "T" is used to indicate the bale spears or teeth on the bale mover. As seen in FIGS. 4-19, the spears or teeth are arranged in two pairs of spaced-apart teeth. In the prior art bale movers, the two pairs of bale teeth are fixed to a main frame or tool bar in the same horizontal plane wherein the instant invention, each of the pairs of teeth are independently vertically movable with respect to the tool bar as will be described hereinafter.

To stress the importance of Applicant's bale mover structure, and its ability to transport a pair of bales to a remote location without the net wrap material on the bales being damaged, the method or methods of loading and unloading bales with prior art bale movers will be described. In the prior art, there are two primary scenarios for loading, transporting and unloading a pair of bales from the field to a location where the bales will be stored or consumed.

Figure 4:
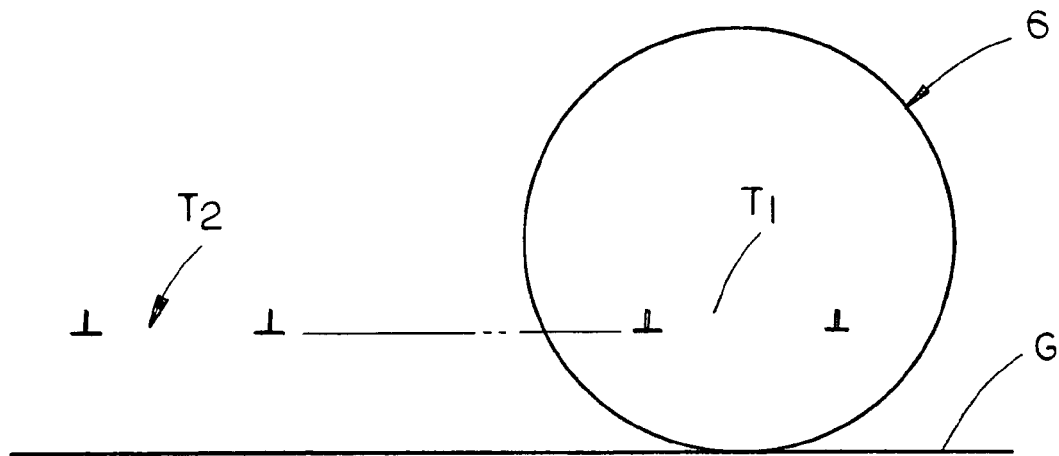
FIGS. 4-8 are rear schematics of one prior art method of moving a pair of round bales so that the net wrap material on the first (right) bale is not damaged during the spearing of the second (left) bale but may result in damage to the net wrap material on the second bale during the unloading of the bales from the prior art bale mover.
Figure 5:
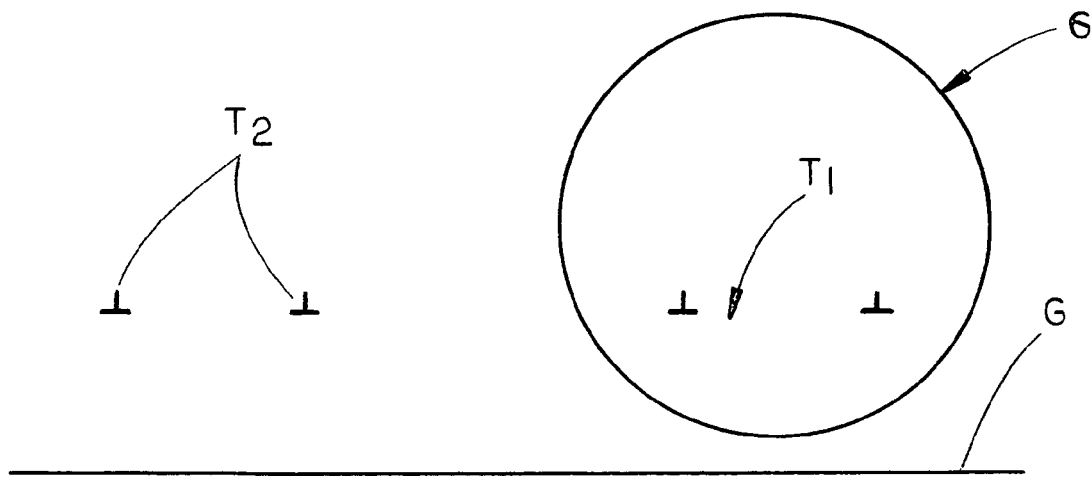
Figure 6:
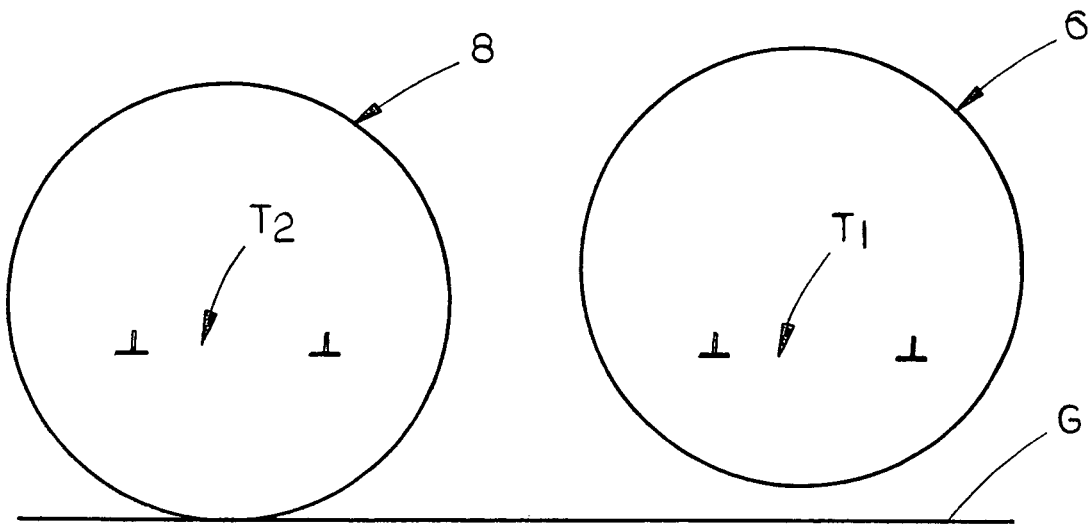
Figure 7:
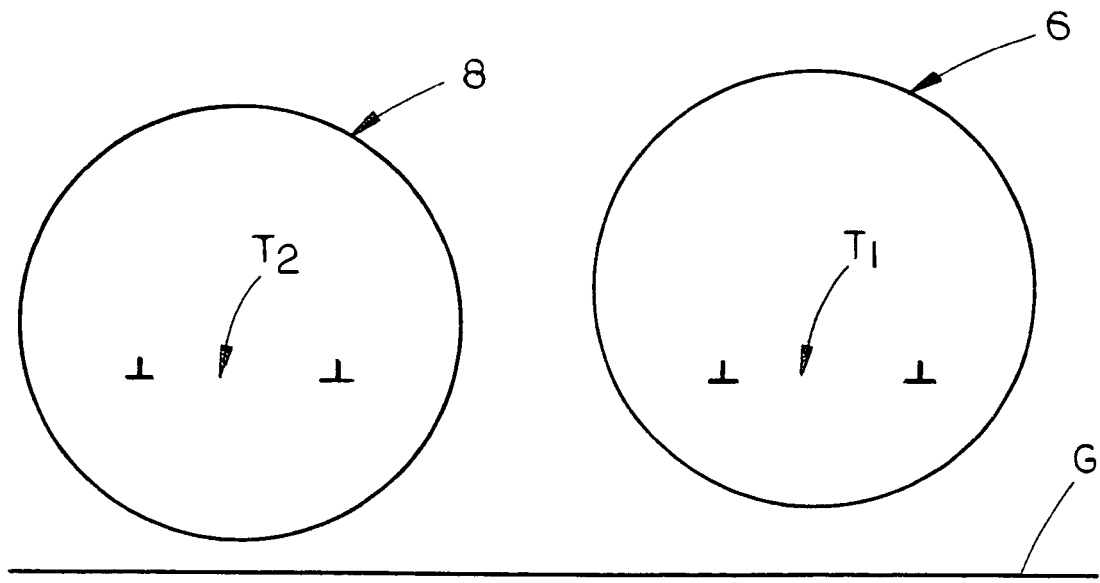
Figure 8:
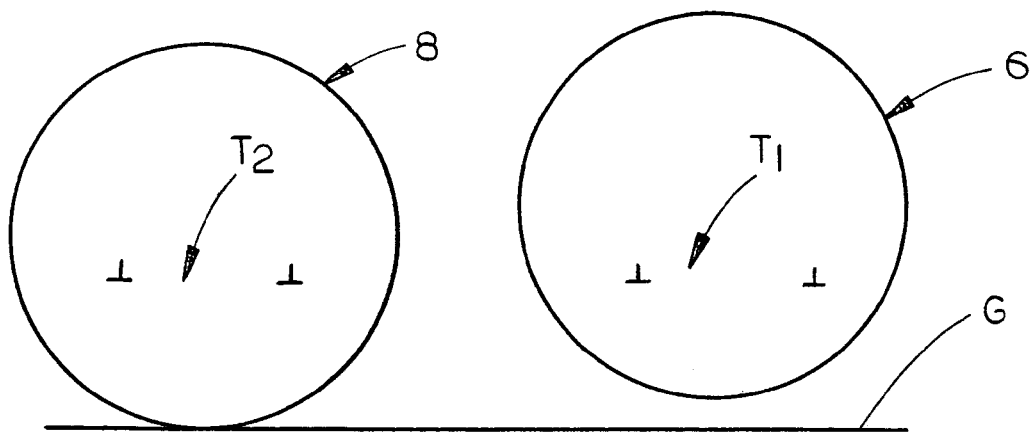

FIGS. 4-8 depict a first scenario for loading, transporting and unloading a pair of bales. Bale 6 is normally placed on the ground in a field by a conventional round baler. Inasmuch as the prior art bale movers have a first pair of teeth T1 and have a second pair of teeth designated by T2, those four teeth will be in the same horizontal plane since they are fixed to the tool bar of the bale mover. The tractor operator will drive the tractor rearwardly so that the teeth T1 are driven into the bale 6. The next step in the first scenario is shown in FIG. 5, wherein the prior art bale mover is raised so that the bale 6 is raised from the ground G. The tractor is then driven to the next bale located in the field. While the teeth T2 are speared into the bale 8, the bale 6 remains above the ground. The bale 6 is positioned above the ground so that it will not be pushed rearwardly as the teeth T2 are speared into the bale 8. The next step in this scenario is depicted in FIG. 7 wherein the bale 8 is raised from the ground G and the bale 6 is raised even more from the position of FIG. 6. When the bale mover has been moved to the desired location for unloading the bales, the prior art bale mover is lowered to lower bale 8 onto the ground G, which causes the bale 6 to be lowered somewhat but still out ground engagement. The only way to lower bale 6 onto the ground in a side-by-side relationship with bale 8 is to attempt to flatten bale 8 somewhat so that bale 6 will be lowered into ground engagement. In this scenario, although the net wrap material is not damaged on bale 6 when bale 8 is being speared, since bale 6 is suspended above the ground at that time, the damage to the net wrap material on bale 8 will be damaged when bale 6 is attempted to be lowered into ground engagement.

Figure 9:
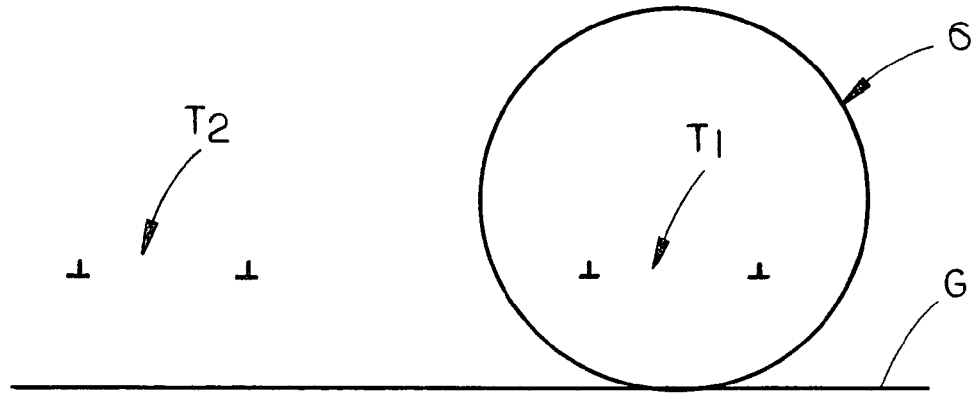
FIGS. 9-13 are rear schematics of another prior method of moving a pair of round bales which may damage the net wrap material on the first bale (right) during the spearing of the second (left) bale during the loading of the bales on a prior art bale mover.
Figure 10:
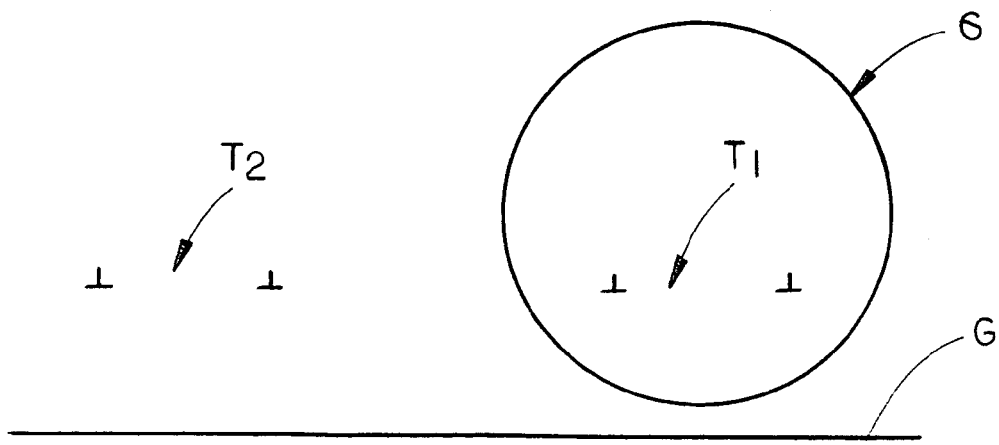
Figure 11:
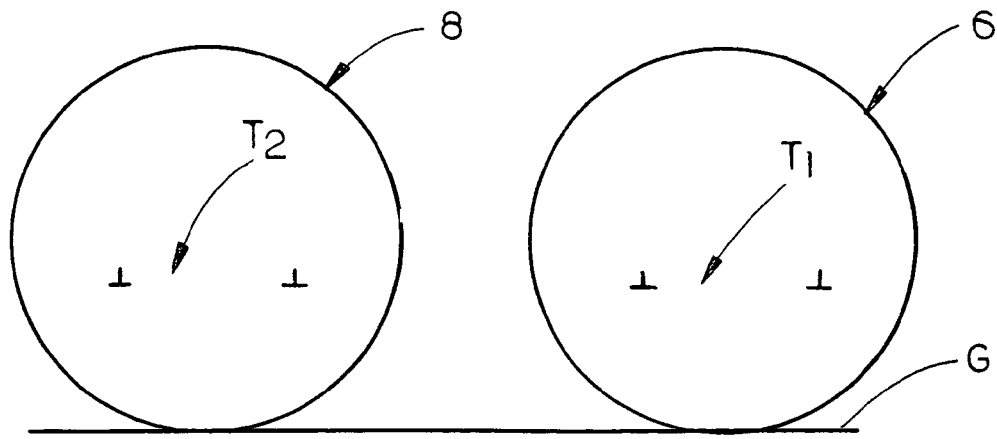
Figure 12:
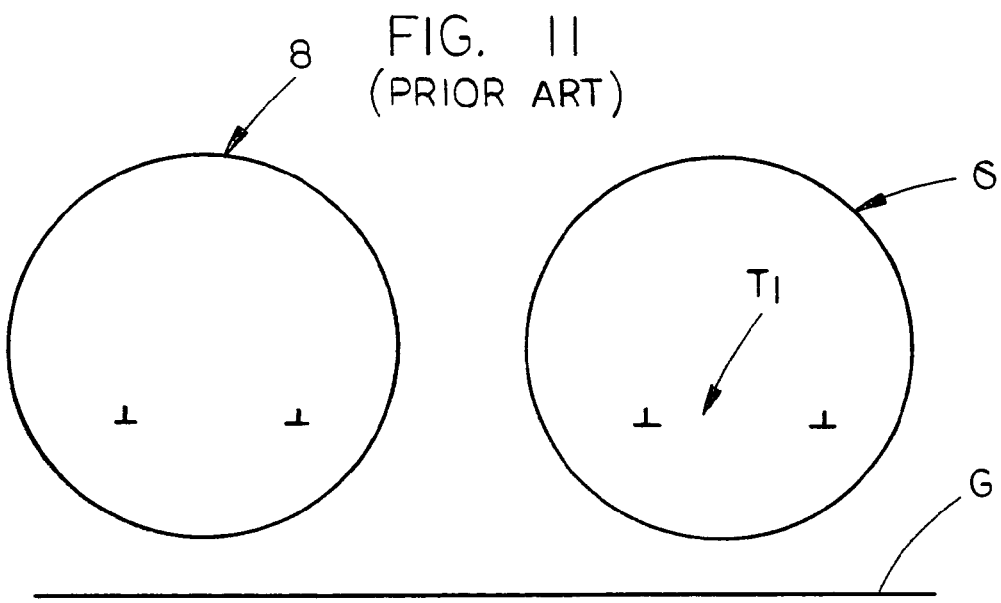
Figure 13:
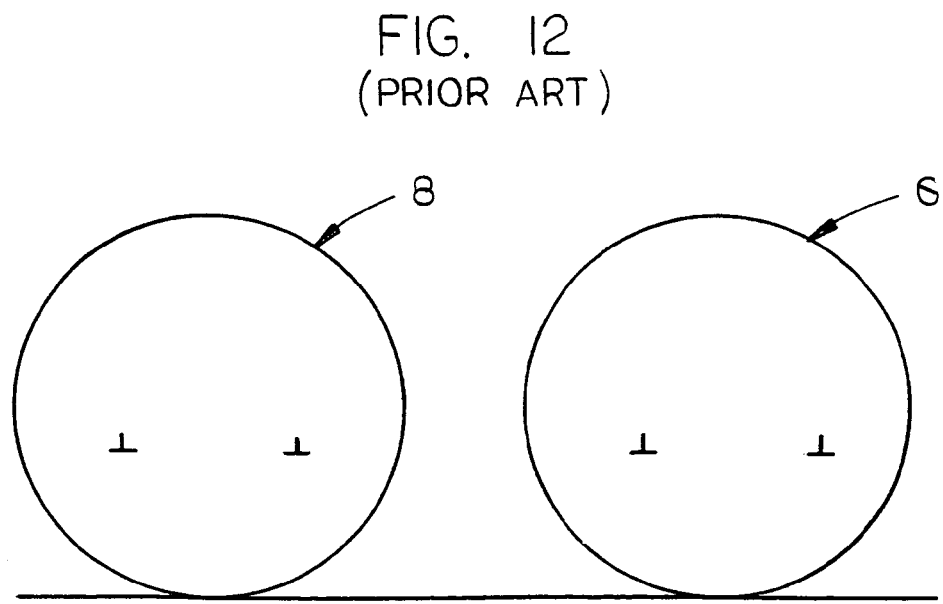

FIGS. 9-13 illustrate the sequence of a second scenario which is sometimes practiced with the use of a prior art bale mover. As seen in FIG. 9, the teeth T1 are driven or speared into a bale 6 while the bale 6 is on the ground. This step is the same as the first step of FIG. 4. The bale 6 is then lifted from the ground as seen in FIG. 10 which mimics the step of FIG. 5. The next step in the second scenario is illustrated in FIG. 11 wherein the bale 6 is lowered to the ground at one side of the bale 8. Bale 8 is then speared by the teeth T2 which necessarily means that bale T1 is pushed rearwardly on the ground as the teeth T2 are speared into the bale 8 with the sliding movement of bale 6 on the ground frequently causing damage to the net wrap material on the bale 6. After bale 8 has been speared as illustrated in FIG. 11, the prior art bale mover is raised so that the bales 6 and 8 are raised from the ground G. The bales 6 and 8 are then transported to the location where the bales are to be stored or consumed. Since the bottoms of the bales 6 and 8 dwell in the same plane, the bales 6 and 8 may be simultaneously lowered into ground engagement which eliminates the need for slidably moving one bale or another as in the first scenario.

The difference between the two scenarios may be summarized as follows. In the first scenario, damage may occur to the net wrap material on bale 8 when the bales are being unloaded. In the second scenario, the potential damage to the net wrap material on one of the bales occurs during the loading of the bales. It can therefore be seen that both of the prior art scenarios result in possible damage to the net wrap material on one or more of the bales. As illustrated in FIGS. 14-19 the net wrap on the bales will not be damaged when the bale mover of the instant invention is utilized since neither of the bales are pushed on the ground.

The round bale mover or mover of this invention is referred to by the reference numeral 10 which is adapted to be secured to the three-point hitch 12 mounted at the rear of a tractor 14 or to the forward end of a front end loader 16 which includes a pair of conventional boom arms 18 and a hydraulic cylinder 20. As will be described hereinafter, the bale mover is designed to carry or move a pair of large round bales 6 and 8 in a side-by-side relationship.

Figure 2:
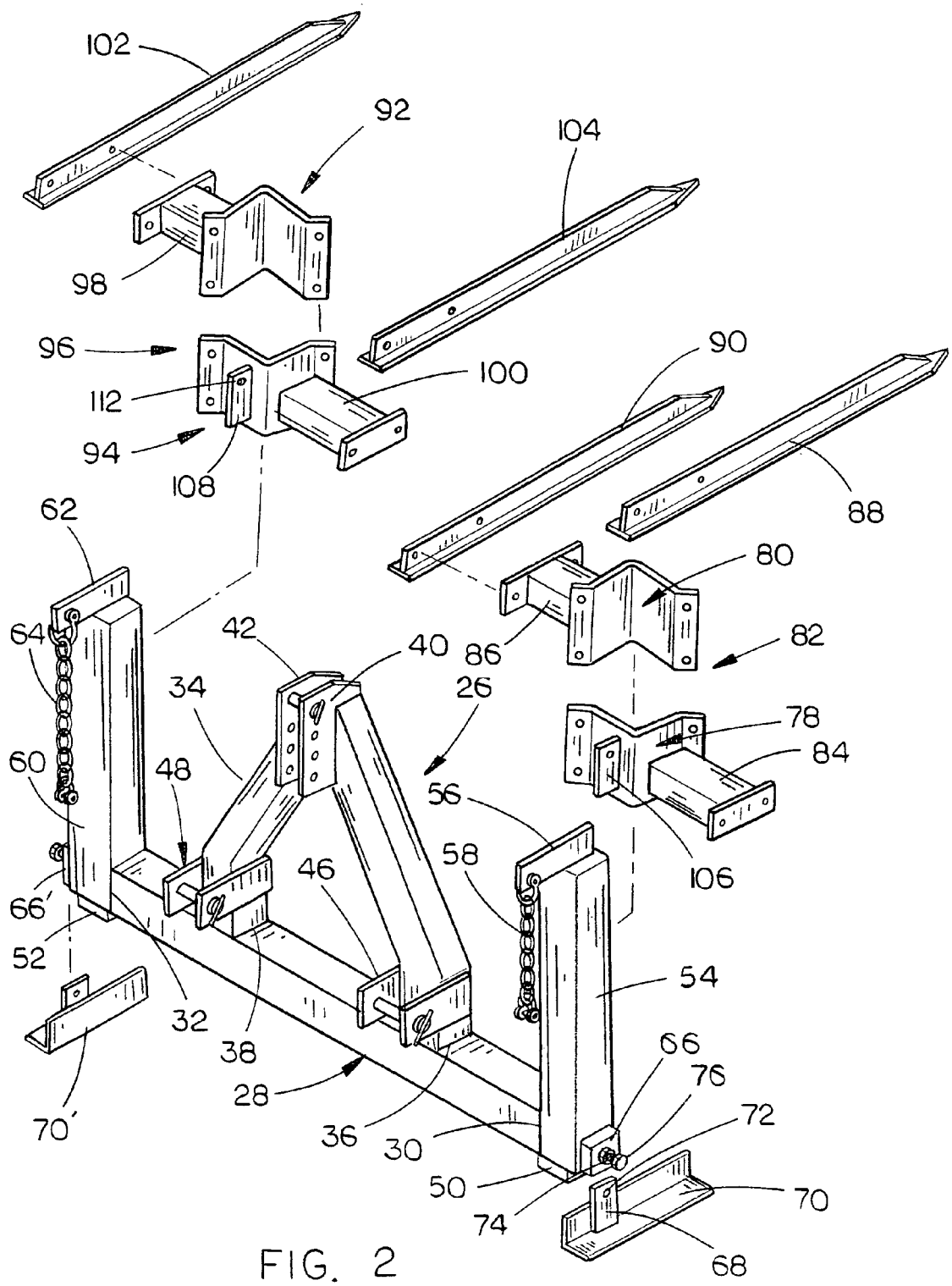
FIG. 2 is a rear exploded perspective view of the bale mover of this invention.
Figure 3:
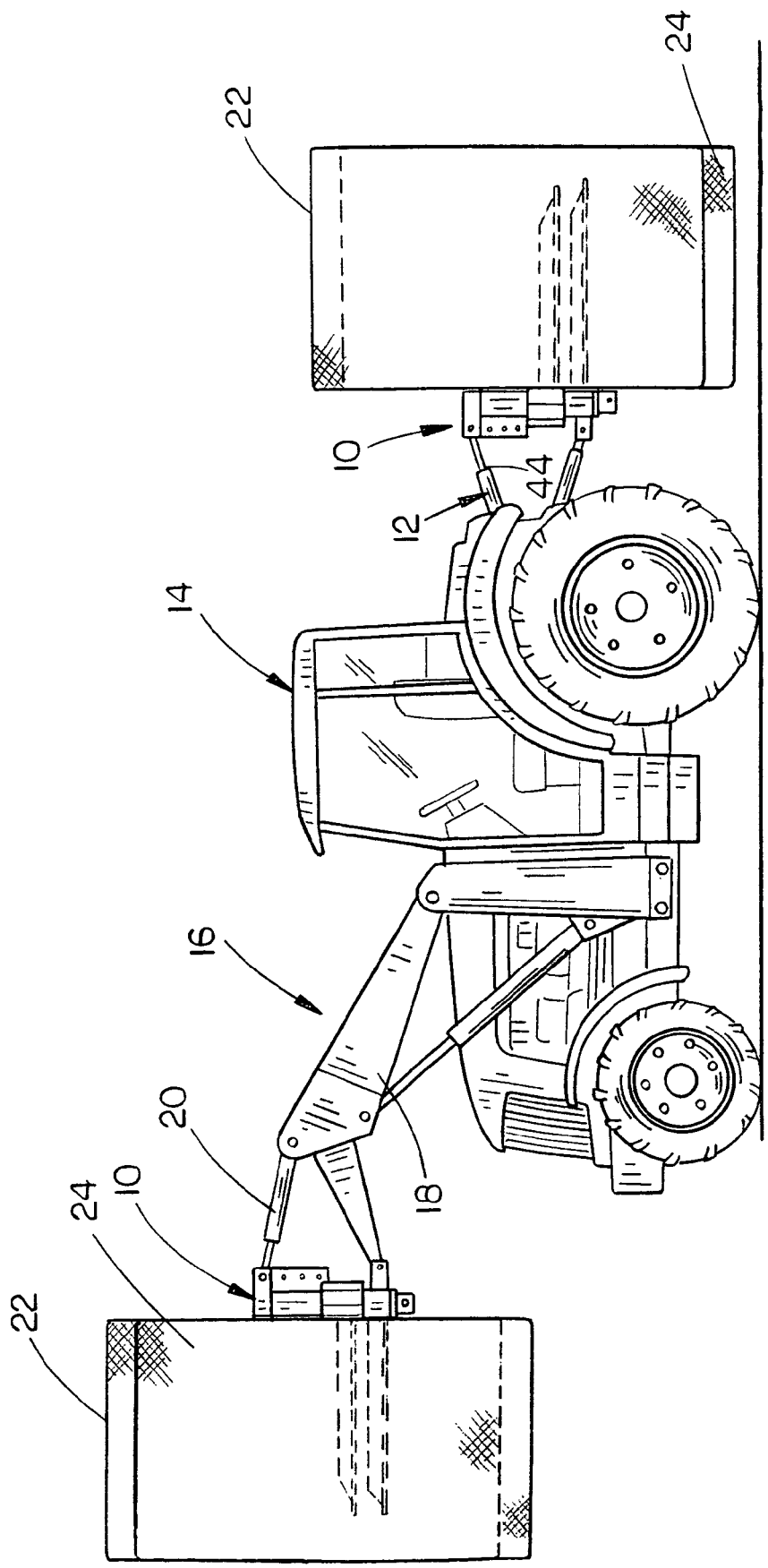
FIG. 3 is a side view illustrating the bale mover of this invention mounted on the three-point hitch of a tractor and also to the forward end of a front-end loader mounted on the tractor.

Mover 10 includes a frame means 26 having a transversely extending tool bar or frame member 28 which has a first end 30 and a second end 32. An inverted V-shaped hitch frame 34 has the lower ends thereof welded to frame member 28 at 36 and 38 respectively. A pair of attachment plates 40 and 42 are welded to the upper end of frame 36 and extend rearwardly therefrom for adjustable attachment to the upper point, link or hydraulic cylinder 44. Rearwardly extending attachment plate assemblies 46 and 48 are secured to the lower ends of frame 34 for attachment to the lower links or points of the three-point hitch 12 in conventional fashion. Skid plates 50 and 52 are secured to the underside of frame member 28 at the opposite ends thereof (FIG. 2). An upstanding post or support 54 is welded to the end 30 of frame member 28 and extends upwardly therefrom. Bracket 56 is welded to the upper end of post 54 and has one end of a tether or chain 58 secured thereto. Post or support 60 is welded to end 32 of frame member 28 and extends upwardly therefrom. Bracket 62 is welded to the upper end of posts 60 and has one end of chain or tether 64 secured thereto. It should be noted that the length of chain 64 is greater than the length of chain 58 for a reason to be described hereinafter.

Channel member 66 is welded to the lower outer surface of posts 54 and is adapted to receive plate 68 therein which extends upwardly from an angle iron support 70. Plate 68 has an opening 72 formed therein. A nut 74 is welded to the outer side of channel member 66 which is adapted to threadably receive a stud bolt 76 which extends through an opening in post 54 so as to be received by opening 72 in plate 68 to position and secure the support 70 to the post 54. Similarly, a support 70' is adapted to be selectively removably secured to channel member 66' which is welded to post 60. Supports 70 and 70' serve as stand members when the bale mover 10 is detached from the tractor.

Teeth or spear supports 78 and 80 are bolted together to form a tubular support 82 which is slidably mounted on post 54. Supports 78 and 80 have horizontally extending tubes 84 and 86 extending from the sides thereof respectively to which the teeth or spears 88 and 90 are attached respectively. Although inverted T-shaped teeth are shown, the cross-section thereof could be round, etc.

Teeth or spear supports 92 and 94 are bolted together to form a tubular support 96 which is slidably mounted on post 60. Supports 92 and 94 have horizontally extending tubes 98 and 100 extending from the sides thereof respectively to which the teeth or spears 102 and 104 are attached thereto respectively. Although inverted T-shaped teeth or spears 102 and 104 are shown, the cross-section thereof could be round, etc. The tubular supports 78 and 94 have plates 106 and 108 welded thereto respectively by welding and have holes or openings 110 and 112 formed therein respectively to which the lower ends of the chains 58 and 64 are secured respectively.

The round bale mover 10 of this invention may either be mounted on the three-point hitch of the tractor or mounted at the front end of a front end loader mounted on the tractor or mounted on both. If the mover 10 is mounted on the three-point hitch of the tractor, the three-points 40-42, 46 and 48 are secured to the three-points or linkages of the three-point hitch. If the mover 10 is secured to the front end of the front end loader 16, the boom arms thereof will be connected to the points 46 and 48 respectively and the hydraulic cylinder 44 will be connected to the plates 40-42 by means of the pins shown in the drawings.

In use, the chain 58, because it is shorter than the chain 64, will position the tubular support 82 at a higher position on post 44 than the tubular support 96 is positioned on the post 60. The chains 58 and 64 permit the tubular supports 82 and 96 to move upwardly on the posts 54 and 60 respectively but limit the downward movement of the same with respect to the posts 54 and 60 respectively. Thus, the teeth 88 and 90 will enter a bale at a higher point than the teeth 102 and 104 will enter the bale if the teeth are in the position as illustrated in FIG. 1.

Figure 1:
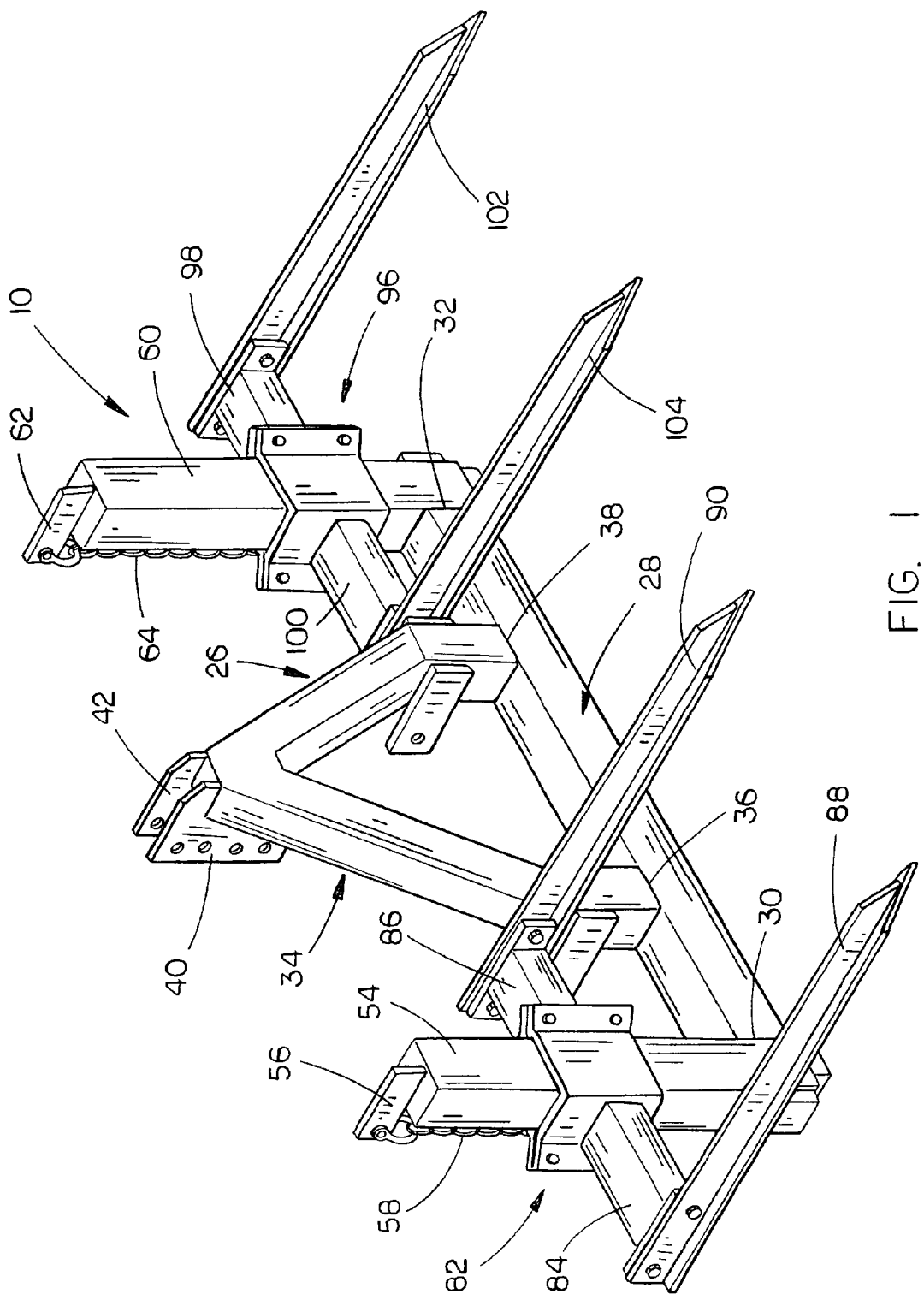
FIG. 1 is a front perspective view of the bale mover of this invention.
Figure 14:
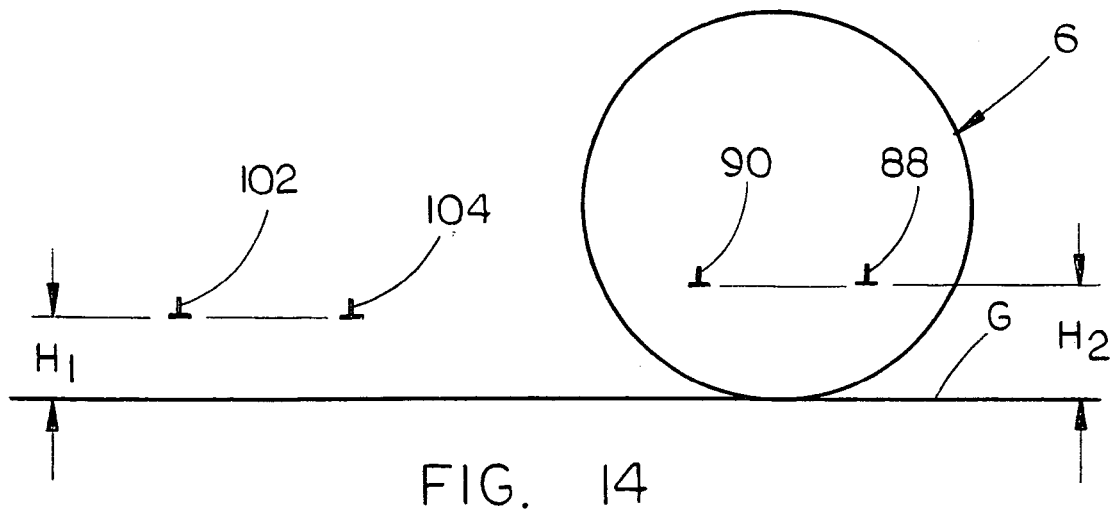
FIGS. 14-19 are rear schematics of the sequence of the loading and unloading of a pair of bales utilizing the bale mover of this invention which prevents damage to the net wrap material on the bales during the loading and unloading of the same.
Figure 15:
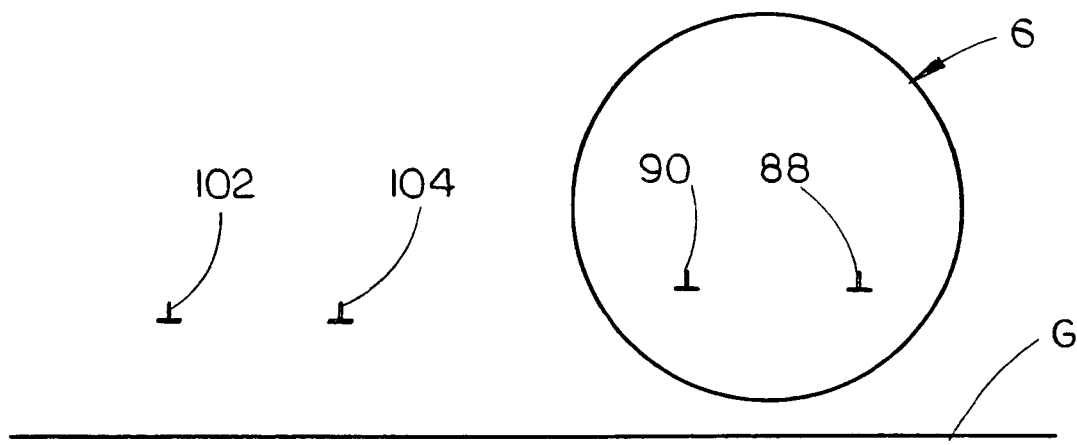
Figure 16:
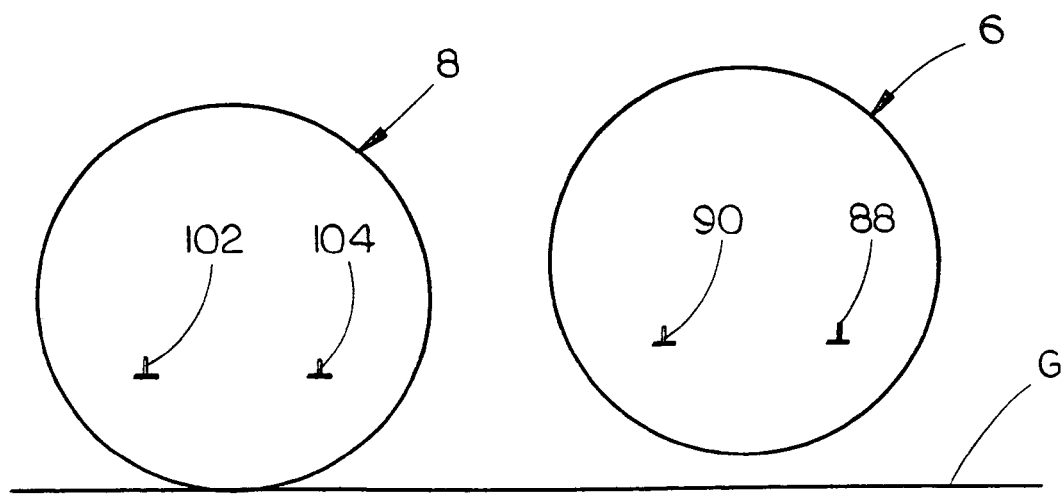
Figure 17:
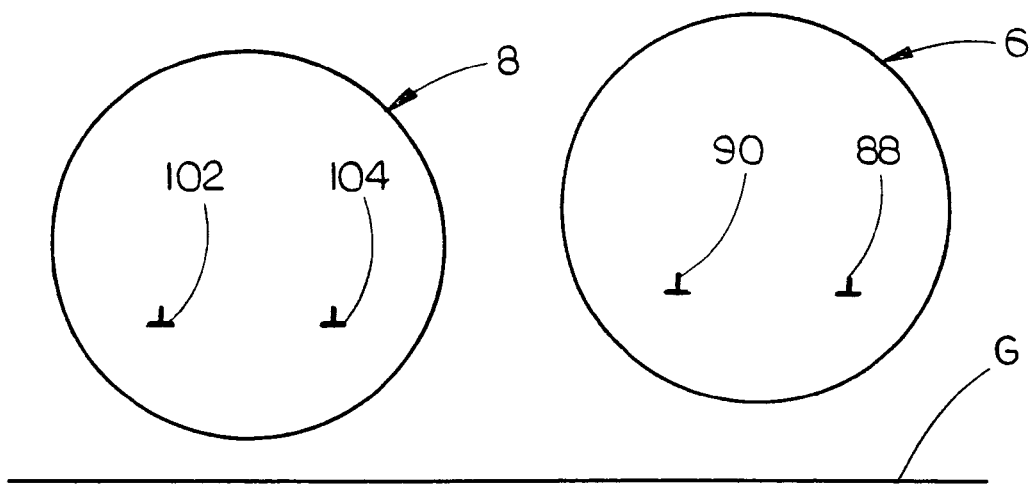
Figure 18:
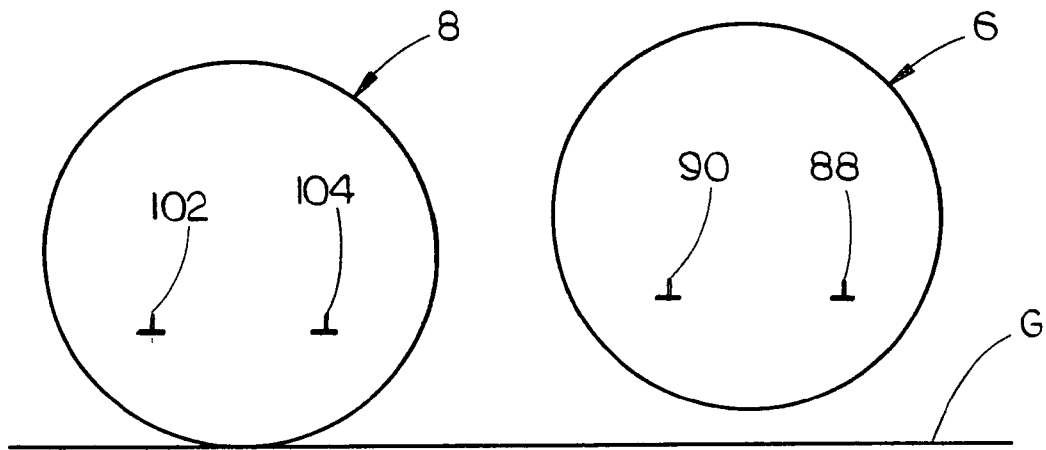
Figure 19:
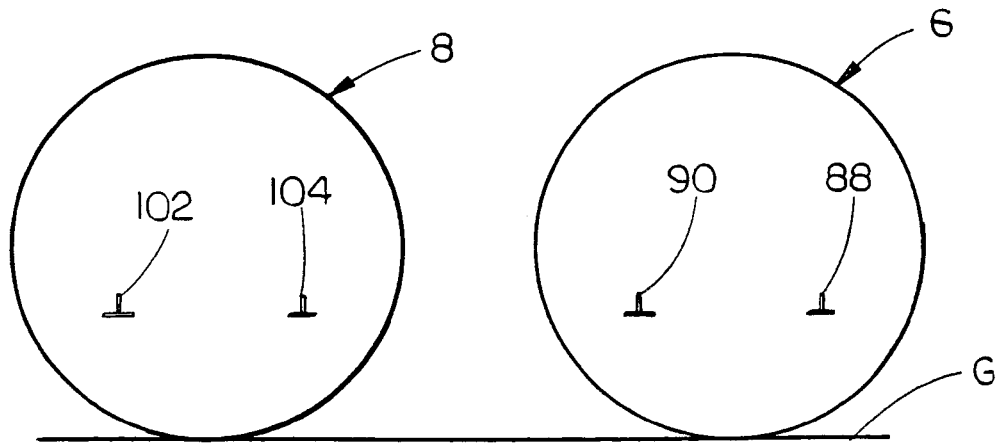

As seen in FIG. 4, the height of the teeth 102 and 104 when they are in the position of FIG. 1 have a height which is termed H1 in FIG. 14. In FIG. 14, the height of the teeth 88 and 90 above the ground is represented by the height H2. The tractor is backed up to a bale 6 resting on the ground as illustrated in FIG. 14. The tractor is then moved rearwardly to cause the teeth 88 and 90 to spear into or penetrate into the end of the bale 6. When the teeth 88 and 90 have been completely inserted into the bale 6, the bale 6 is raised from the position of FIG. 14 to the position of FIG. 15. As seen in FIG. 15, and in all of the views of FIG. 14-19, the teeth 88 and 90 are normally in a higher position than the teeth 102 and 104 with respect to the ground. After the bale 6 has been raised from the ground G in FIG. 15, the tractor is driven to a location where a second bale 8 is resting on the ground. While the bale 6 is suspended above the ground, as seen in FIG. 16, the teeth 102 and 104 are driven or speared into the end of the bale 8 without the bale 6 sliding on the ground as occurs in one scenario of the prior art. When the teeth 102 and 104 have been inserted into the end of the bale 8, the bales 6 and 8 are raised from the position of FIG. 16 to the position of FIG. 17 so that bale 8 is raised from the ground. The bales 6 and 8 are then moved in the transport position to the location where they are going to be stored or consumed by livestock. When the bales 6 and 8 are at the desired location, the bale mover 10 is lowered until the bale 8 engages the ground G as seen in FIG. 18. As seen in FIG. 18, at that point in the sequence, bale 6 is still suspended above the ground G. Continued downward movement of the bale mover from the position of FIG. 18 to the position of FIG. 19 causes the tubular support 96 to slidably move upwardly or float upwardly on the post 60, thereby permitting the bale mover 10 to be lowered until the lower end of the bale 6 engages and is supported on the ground G.

Figure 20:
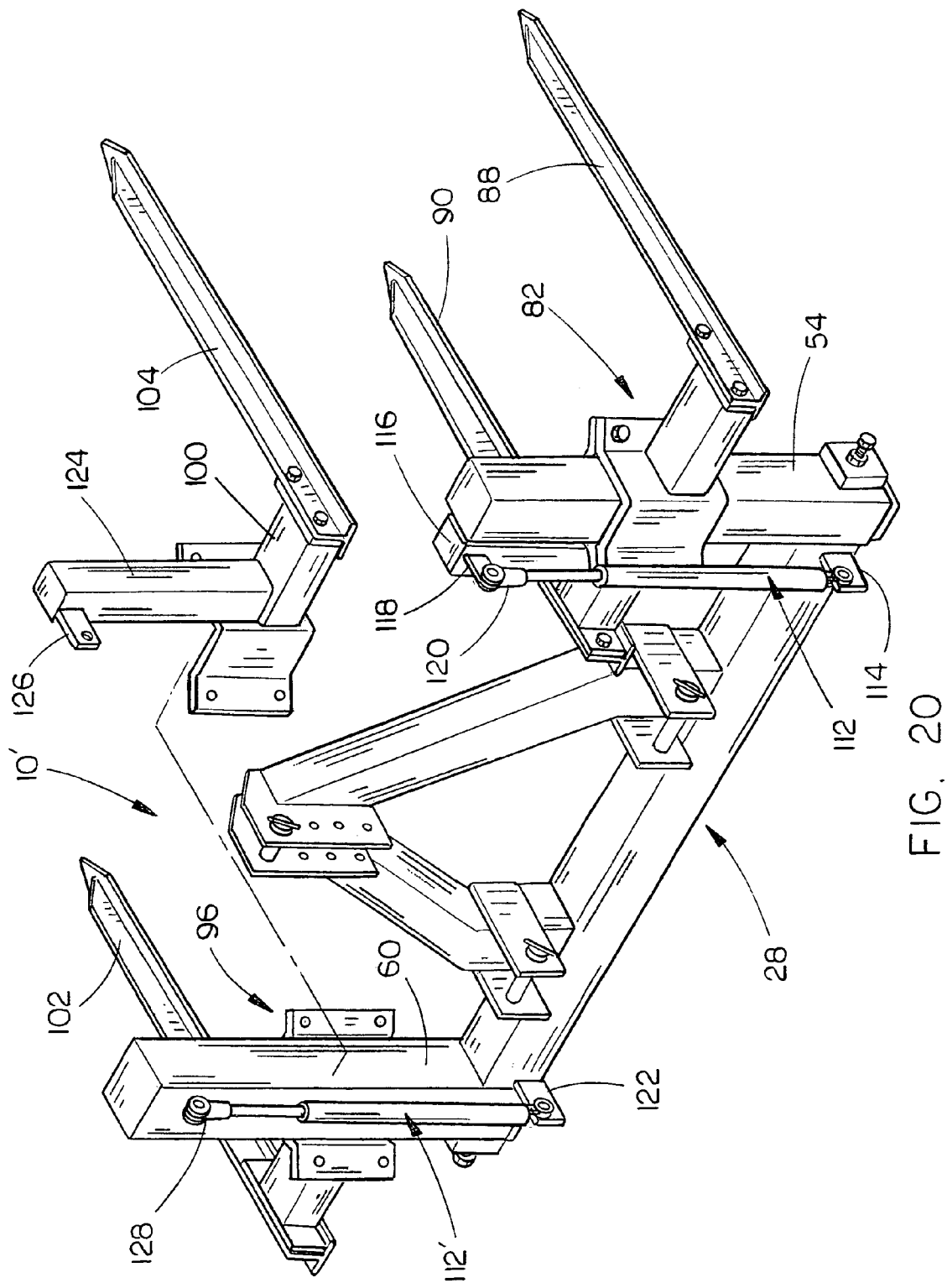
FIG. 20 is a partial exploded perspective view of a modified form of the invention.
Figure 21:
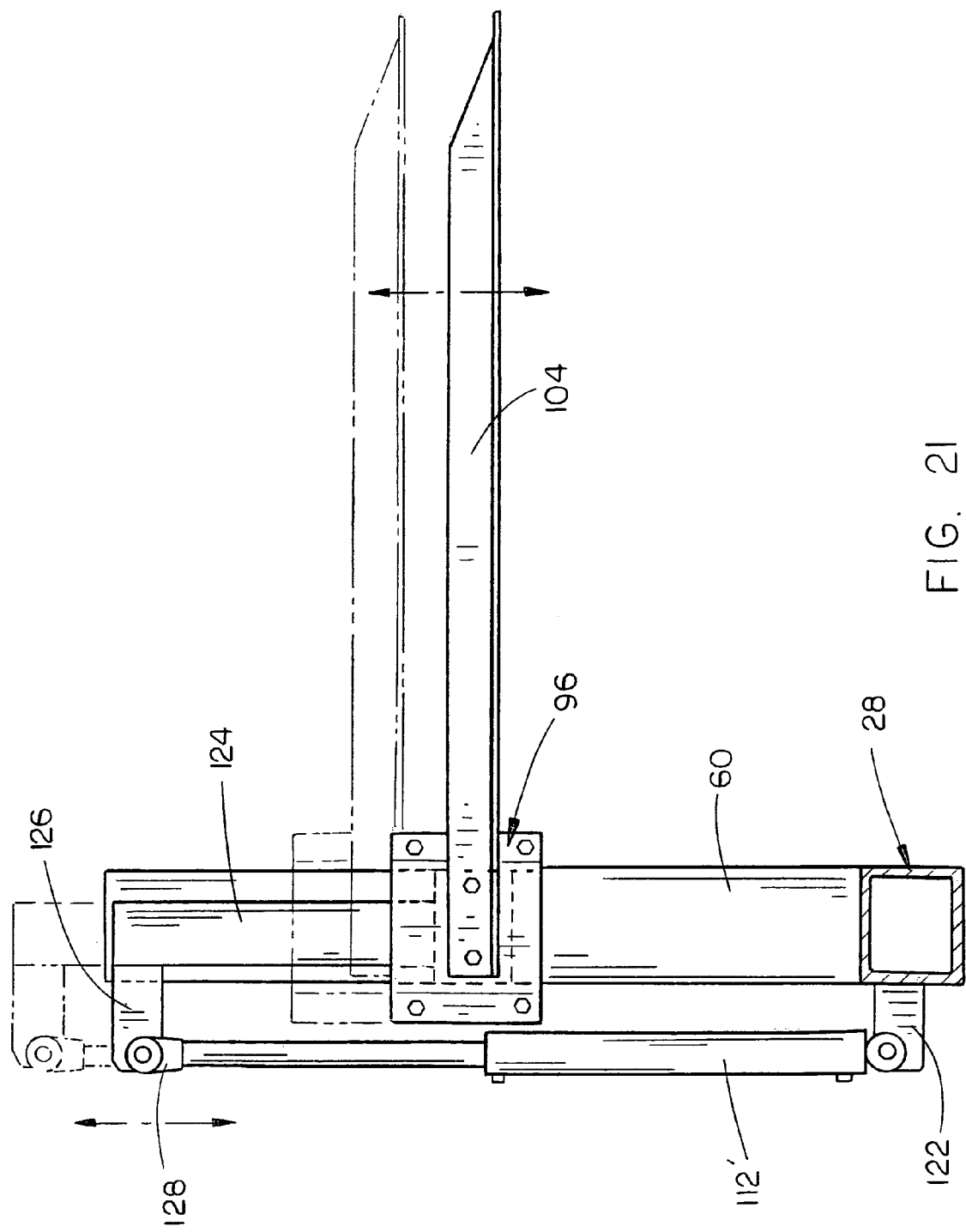
FIG. 21 is a side elevational view of the embodiment of FIG. 20.

A modified form of the bale mover is shown in FIGS. 20 and 21 and is designated by the reference numeral 10'. The only difference between the bale mover 10' and the bale mover 10 is that both pairs of the bale teeth are vertically moved on their respective posts by hydraulic cylinders 112 and 112'. FIG. 20 illustrates that the hydraulic cylinder 112 is being used with the bale teeth 88 and 90 with the hydraulic cylinder 112' being used with the bale teeth 102 and 104. Either of the hydraulic cylinders 112 and 112' may be omitted if so desired and in that case, the tubular support 82 or 96 may be either rigidly secured to their respective posts or may have a tether chain attached thereto. In FIG. 20, a bracket 114 is secured to the lower end of post 54 or to the outer end of the main frame 28 and has a base end of the cylinder 112 pivotally secured thereto. A tube or post 116 has its lower end secured to the end of frame member 28 and to the side of post 54 and extends upwardly therefrom. Bracket 118 is secured to the upper rearward end of the post 116 and has the rod end 120 of the hydraulic cylinder 112 secured thereto as seen in FIG. 20. Similarly, the lower or base end of hydraulic cylinder 112' is secured to a bracket 122 which is either secured to the frame member 28 or to the post 60. Tube or post 124 is secured to the tubular member 100 and extends upwardly therefrom. A bracket 126 is secured to the upper end of the post 124 and is secured to the rod end 128 of the hydraulic cylinder 112'.

In use, the hydraulic cylinder 112 may be used to move the bale teeth 88 and 90 upwardly and downwardly to position the bale teeth 88 and 90 with respect to the post 54 and with the bale resting on the ground or to raise or lower a bale supported on the bale teeth 88 and 90. The hydraulic cylinder 112 is also useful to move the bale teeth 88 and 90 should the tubular support 82 bind on the post 54 as may occur when the bale mover 110 is being used on a side hill or the like. The hydraulic cylinder 112' functions in the same manner as the hydraulic cylinder 112 to raise and lower the bale teeth 102 and 104 respectively.

Thus, the hydraulic cylinder 112, if it is the only hydraulic cylinder utilized in the embodiment 10' to raise and lower the bale teeth 88 and 90, may be vertically moved to not only be extended into a bale at the proper location thereof but which may also be raised and lowered to properly position the bale associated therewith. The hydraulic cylinder 112' is used in the same manner as the hydraulic cylinder 112.

It can therefore be seen that a novel bale mover has been provided which permits a pair of bales to be mounted or loaded thereon without the necessity of sliding one of the bales along the ground which could damage the net wrap material on the bale but which also permits the bales to be placed in a side-by-side relationship without the necessity of sliding one of the bales along the ground.

It can therefore be seen that the invention accomplishes all of the stated objectives.

The invention claimed is:

1. A round bale mover for attachment to a vertically movable three-point hitch at the rearward end of a tractor, comprising:
    an elongated transversely and horizontally extending main frame having first and second ends;
    an upstanding attachment frame secured to said main frame between the ends thereof adapted to be operatively selectively secured to the three-point hitch of the tractor;
    first and second upstanding posts having upper and lower ends;
    said lower end of said first post being secured to said first end of said main frame;
    said lower end of said second post being secured to said second end of said main frame;
    first and second tubular supports vertically slidably mounted on said first and second posts respectively which have opposite sides and inner and outer sides;
    said first and second tubular supports being movable between upper and lower positions with respect to said first and second posts respectively;
    first, second, third and fourth elongated bale teeth having inner and outer ends;
    said first bale tooth being operatively secured at its inner end to said first support at one of said opposite sides thereof and extending outwardly therefrom;
    said second bale tooth being operatively secured at its said inner end to said first tubular support at the other of said opposite sides thereof and extending outwardly therefrom;
    said third bale tooth being operatively secured at its said inner end to said second tubular support at one side of said opposite sides thereof and extending outwardly therefrom;
    said fourth bale tooth being operatively secured at its said inner end to said second tubular support at the other of said opposite sides thereof and extending outwardly therefrom;
    said first and second bale teeth being horizontally spaced-apart to enable said first and second bale teeth to be driven into a first round bale;
    said third and fourth bale teeth being horizontally spaced-apart to enable said third and fourth bale teeth to be driven into a second bale;
    first and second elongated tether members having upper and lower ends;
    said upper end of said first tether member being secured to said first post adjacent the upper end thereof;
    said lower end of said first tether member being secured to said first tubular support to limit the downward movement of said first tubular support with respect to said first post;
    said upper end of said second tether member being secured to said second post adjacent the upper end thereof;
    said lower end of said second tether member being secured to said second tubular support to limit the downward movement of said second tubular support with respect to said second post;
    the effective length of one of said tether members being longer than the effective length of the other tether member so that the tubular support connect to the shorter tether member will be positioned in a plane above the other tubular support so that the bale teeth secured to that tubular support will be in a plane above the bale teeth secured to the other tubular support.

2. The round bale mover of claim 1 wherein said tether members are length adjustable.

3. The round bale mover of claim 1 further including first and second stand members which are selectively detachably secured to said lower ends of said first and second posts for supporting the bale mover when the bale mover is detached from the three-point hitch.

4. A round bale mover for attachment to the vertically movable forward end of a front end loader mounted on a tractor, comprising:
    an elongated transversely and horizontally extending main frame having first and second ends;
    an upstanding attachment frame secured to said main frame between the ends thereof adapted to be operatively selectively secured to the front end loader;
    first and second upstanding posts having upper and lower ends;
    said lower end of said first post being secured to said first end of said main frame;
    said lower end of said second post being secured to said second end of said main frame;
    first and second tubular supports vertically slidably mounted on said first and second posts respectively which have opposite sides and inner and outer sides;
    said first and second tubular supports being movable between upper and lower positions with respect to said first and second posts respectively;
    first, second, third and fourth elongated bale teeth having inner and outer ends;
    said first bale tooth being operatively secured at its inner end to said first tubular support at one of said opposite sides thereof and extending outwardly therefrom;
    said second bale tooth being operatively secured at its said inner end to said first tubular support at the other of said opposite sides thereof and extending outwardly therefrom;
    said third bale tooth being operatively secured at its said inner end to said second tubular support at one side of said opposite sides thereof and extending outwardly therefrom;

said fourth bale tooth being operatively secured at its said inner end to said second tubular support at the other of said opposite sides thereof and extending outwardly therefrom;

said first and second bale teeth being horizontally spaced-apart to enable said first and second bale teeth to be driven into a first round bale;

said third and fourth bale teeth being horizontally spaced-apart to enable said third and fourth bale teeth to be driven into a second bale;

first and second elongated tether members having upper and lower ends;

said upper end of said first tether member being secured to said first post adjacent the upper end thereof;

said lower end of said first tether member being secured to said first support to limit the downward movement of said first support with respect to said first post;

said upper end of said second tether member being secured to said second post adjacent the upper end thereof;

said lower end of said second tether member being secured to said second tubular support to limit the downward movement of said second tubular support with respect to said second post;

the effective length of one of said tether members being longer than the effective length of the other tether member so that the tubular support connected to the shorter tether member will be positioned in a plane above the other tubular support so that the bale teeth secured to that tubular support member will be in a plane above the bale teeth secured to the other tubular support member.

5. The round bale mover of claim 4 wherein said tether members are length adjustable.

6. The round bale mover of claim 4 further including first and second stand members which are selectively detachably secured to said lower ends of said first and second posts for supporting the bale mover when the bale mover is detached from the front end loader.

7. A round bale mover for attachment to a vertically movable three-point hitch at the rearward end of a tractor, comprising:

an elongated transversely and horizontally extending main frame having first and second ends;

an upstanding attachment frame secured to said main frame between the ends thereof adapted to be operatively selectively secured to the three-point hitch of the tractor;

first and second upstanding posts having upper and lower ends;

said lower end of said first post being secured to said first end of said main frame;

said lower end of said second post being secured to said second end of said main frame;

first and second tooth supports vertically slidably mounted on said first and second posts respectively which have opposite sides and inner and outer sides;

said first and second tooth supports being movable between upper and lower positions with respect to said first and second posts respectively;

first, second, third and fourth elongated bale teeth having forward and rearward ends;

said first bale tooth being operatively secured at its forward end to said first tooth support at one of said opposite sides thereof and extending rearwardly therefrom;

said second bale tooth being operatively secured at its said forward end to said first tooth support at the other of said opposite sides thereof and extending rearwardly therefrom;

said third bale tooth being operatively secured at its said forward end to said second tooth support at one side of said opposite sides thereof and extending rearwardly therefrom;

said fourth bale tooth being operatively secured at its said forward end to said second tooth support at the other of said opposite sides thereof and extending rearwardly therefrom;

said first and second bale teeth being horizontally spaced-apart to enable said first and second bale teeth to be driven into a first round bale;

said third and fourth bale teeth being horizontally spaced-apart to enable said third and fourth bale teeth to be driven into a second bale;

first and second generally vertically disposed hydraulic cylinders;

said first hydraulic cylinder being operatively connected to said first tooth support for moving said first tooth support between its said upper and lower positions;

said second hydraulic cylinder being operatively connected to said second tooth support for moving said second tooth support between its said upper and lower positions;

each of said first and second hydraulic cylinders being independently operable.

8. A round bale mover for attachment to the vertically movable forward end of a front end loader mounted on a tractor, comprising:

an elongated transversely and horizontally extending main frame having first and second ends;

an upstanding attachment frame secured to said main frame between the ends thereof adapted to be operatively selectively secured to the front end loader;

first and second upstanding posts having upper and lower ends;

said lower end of said first post being secured to said first end of said main frame;

said lower end of said second post being secured to said second end of said main frame;

first and second tooth supports vertically slidably mounted on said first and second posts respectively which have opposite sides and inner and outer sides;

said first and second tooth supports being movable between upper and lower positions with respect to said first and second posts respectively;

first, second, third and fourth elongated bale teeth having inner and outer ends;

said first bale tooth being operatively secured at its inner end to said first tooth support at one of said opposite sides thereof and extending forwardly therefrom;

said second bale tooth being operatively secured at its said inner end to said first tooth support at the other of said opposite sides thereof and extending forwardly therefrom;

said third bale tooth being operatively secured at its said inner end to said second tooth support at one side of said opposite sides thereof and extending forwardly therefrom;

said fourth bale tooth being operatively secured at its said inner end to said second tooth support at the other of said opposite sides thereof and extending forwardly therefrom;

said first and second bale teeth being horizontally spaced-apart to enable said first and second bale teeth to be driven into a first round bale;

said third and fourth bale teeth being horizontally spaced-apart to enable said third and fourth bale teeth to be driven into a second bale;

first and second generally vertically disposed hydraulic cylinders;

said first hydraulic cylinder being operatively connected to said first tooth support for moving said first tooth support between its said upper and lower positions;

said second hydraulic cylinder being operatively connected to said second tooth support for moving said second tooth support between its said upper and lower positions;

each of said first and second hydraulic cylinders being independently operable.

* * * * *